United States Patent [19]

Christe et al.

[11] 4,329,330

[45] May 11, 1982

[54] IODINE (VII) OXYTETRAFLUOROHYPOFLUORITE AND A PROCESS FOR PREPARING THE SAME

[75] Inventors: Karl O. Christe, Calabasas; Richard D. Wilson, Canoga Park, both of Calif.

[73] Assignee: Rockwell International Corporation, El Segundo, Calif.

[21] Appl. No.: 176,314

[22] Filed: Aug. 8, 1980

[51] Int. Cl.³ .............................................. C01B 7/24
[52] U.S. Cl. .................................... 423/473; 423/466; 423/472; 149/119
[58] Field of Search ................ 423/462, 466, 472, 473

[56] References Cited

PUBLICATIONS

Berry et al., "Molecular Complexes and Redox Reactions of Iodine Pentafluoride", *J. Chem. Research(S)*, Oct. 1978, p. 377.

Gillespie et al., "Lewis Acid–Base Properties of Iodine (VII) Dioxide Trifluoride", *Inorganic Chemistry*, vol. 16, No. 6, (1977), pp. 1384–1392.

*Chemical Abstracts*, vol. 91, (1979), No. 221,675e.

*Primary Examiner*—Brian E. Hearn
*Attorney, Agent, or Firm*—H. F. Hamann; Harry B. Field

[57] ABSTRACT

A fluorinating agent having an empirical formula which comprises $FOIF_4O$ whereby said fluorinating agent is prepared by a metathetical reaction of solutions of $NF_4SbF_6$ and $CsIF_4O_2$ in anhydrous HF, removing the precipitated $CsSbF_6$ and HF solvent, followed by thermal decomposition of the filtrate residue.

5 Claims, No Drawings

IODINE (VII) OXYTETRAFLUOROHYPOFLUORITE AND A PROCESS FOR PREPARING THE SAME

The Government has rights in this invention pursuant to Contract (or grant) N00014-79-C-0176 awarded by the U.S. Department of the Navy.

BACKGROUND OF THE INVENTION

1. Field of the Invention

This invention relates to fluorinating agents and, more specifically, to iodine (VII) oxytetrafluorohypofluorite and the process for its preparation.

2. Description of the Prior Art

The number of elements known to form stable hypofluorites is very limited. They are known only for carbon, nitrogen, sulfur, selenium, fluorine, and chlorine containing compounds. In addition, the unstable hypofluorous acid, HOF, has been prepared. However, no iodine hypofluorites had been known prior to this invention.

Inorganic hypofluorites are generally prepared by the alkali metal fluoride catalyzed fluorination of the corresponding oxyfluorides by elemental fluorine (Lustig and Shreeve, Advances in Fluorine Chemistry, Vol. 7, pages 175-198, 1973). In the case of iodine compounds, this method does not lead to the formation of iodine hypofluorites, as demonstrated by extensive experiments in the inventors' laboratory.

Recent work in the inventors' laboratory has resulted in an alternate synthetic method for the hypofluorites $FOClO_3$ and $FOSO_2F$. It was found that the $NF_4^+ClO_4^-$ and $NF_4^+SO_3F^-$ salts, which were isolated from a metathetical reaction of $NF_4SbF_6$ with $CsClO_4$ or $CsSO_3F$ in anhydrous HF solution, on thermal decomposition yield the corresponding hypofluorites, $FOClO_3$ and $FOSO_2F$. However, application of this approach to $CsIO_4$ failed because $CsIO_4$ interacts with HF to give fluorinated products, as demonstrated by Selig and coworkers (Journal Inorganic Nuclear Chemistry, Supplement, 91, 1976). Furthermore, it was shown by the inventors that $Cs^+IF_4O_2^-$, when dissolved in anhydrous HF undergoes solvolysis to produce $Cs^+HF_2^-$ and $HOIF_4O$.

SUMMARY OF THE INVENTION

Accordingly, there is provided by the present invention iodine (VII) oxytetrafluorohypofluorite ($FOIF_4O$) and a process for preparing the same. The interaction of $CsIF_4O_2$ with $NF_4SbF_6$ in anhydrous HF results in solutions containing $NF_4^+$, $HF_2^-$, and $HOIF_4O$. On standing or when pumped to dryness, these mixtures decompose to yield $NF_3$ and the new compound $FOIF_4O$ in high yield. The latter compound is the first known example of an iodine hypofluorite.

OBJECTS OF THE INVENTION

Therefore, it is an object of the invention to provide a fluorinating agent.

Another object of the invention is to provide a high-density oxidizer for pyrotechnics.

Yet another object of the present invention is to provide a compound capable of introducing fluorine into drugs.

A further object of the present invention is to provide a process for preparing iodine hypofluorites.

Other objects, advantages, and novel features of the present invention will become apparent from the following detailed description.

DESCRIPTION OF THE PREFERRED EMBODIMENTS

In view of the previous art, it appeared very unlikely that any iodine hypofluorites could be prepared. Direct fluorinations with elemental fluorine do not produce hypofluorites, metathetical reactions of $IO_4^-$ in anhydrous HF are impossible because $IO_4^-$ chemically reacts with HF to give other products, and the synthesis of an $NF_4^+IF_4O_2^-$ salt was not possible due to the solvolysis of $IF_4O_2^-$ to give $HOIF_4O$.

Surprisingly, it was now found that the product from a low-temperature metathetical reaction between $NF_4SbF_6$ and $CsIF_4O_2$ in anhydrous HF solution, when warmed to ambient temperature, produces an iodine hypofluorite in high yield. The first step of this reaction involved the following reaction:

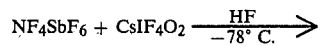

$$NF_4SbF_6 + CsIF_4O_2 \xrightarrow[-78^\circ C.]{HF}$$

$$CsSbF_6 \downarrow + HOIF_4O + NF_4HF_2$$

The $CsSbF_6$ precipitate could be easily filtered off at $-78^\circ$ C. and Raman and F NMR spectoscopy of the filtrate showed the presence of $NF_4^+$ and $HOIF_4O$ with no evidence for the $IF_4O_2^-$ anion. This is in agreement with the above results for $CsIF_4O_2$ which demonstrated that $MIF_4O_2$ salts undergo solvolysis in anhydrous HF according to:

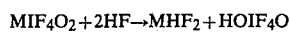

$$MIF_4O_2 + 2HF \rightarrow MHF_2 + HOIF_4O$$

Raman and F NMR specta showed that these $NF_4HF_2$-$HOIF_4O$ containing HF solutions are unstable at room temperature and slowly decompose to $NF_3$ and a new compound identified as a mixture of cis and trans $FOIF_4O$.

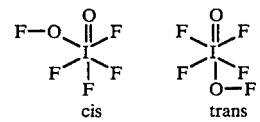

cis        trans

At the same time, the relative intensities of the $NF_4^+$ and $HOIF_4O$ signals decreased accordingly. When the HF solvent was pumped off at $-30^\circ$ C. from a freshly-prepared $NF_4HF_2$-$HOIF_4O$ solution, a white solid residue was obtained. The low-temperature Raman spectrum of this solid showed the presence of the $NF_4^+$ cation, but the remaining bands were too broad to permit a positive distinction between $IF_4O_2^-$, $HOIF_4O$ and possibly some $HF_2^-\cdot nHF$. The new compound $FOIF_4O$ was obtained in high yield by decomposing at room temperature this thermally unstable solid, with the by-product being $NF_3$. Since the same products were obtained from HF solutions which, based on their F NMR and Raman spectra, contained only $HOIF_4O$ but not $IF_4O_2^-$, it appears that $FOIF_4O$ is formed by fluorination of $HOIF_4O$ by either $NF_4^+$ or nascent fluorine formed during the thermal decomposition of the marginally stable $NF_4^+HF_2^-\cdot nHF$.

By way of example and not limitation, the following synthesis of FOIF$_4$O is given. In a typical experiment, CsIF$_4$O$_2$ (5.0 mmol) and NF$_4$SbF$_6$ (5.0 mmol) were placed in a Teflon-FEP metathesis apparatus and anhydrous HF (5 ml liquid) was condensed in at $-78°$ C. The mixture was stirred for one hour at room temperature. The apparatus was cooled to $-78°$ C., inverted and the white precipitate was separated from the solution by pressure filtration. Most of the HF solvent was pumped off over several hours at temperatures ranging from $-64°$ to $-30°$ C. The resulting white solid residue was allowed to decompose during slow warm-up from $-30°$ C. to ambient. The volatile products were passed through a Teflon U-trap containing passivated NaF pellets, followed by a series of cold traps kept at $-78°$, $-95°$, $-112°$ and $-210°$ C. The $-89°$ C. trap contained a small amount of unidentified material which was discarded, the $-95°$ C. fraction consisted of pure FOIF$_4$O (2.36 mmol), the $-112°$ C. trap had 1.69 mmol of FOIF$_4$O containing a small amount of IF$_5$O as impurity, and the contents of the $-210°$ C. trap consisted of NF$_3$ (4.0 mmol). A small amount of white solid residue, which was left behind after the thermal decomposition of the filtrate, was shown by vibrational spectroscopy to consist mainly of trans-CsIF$_4$O$_2$. The filter cake (1.8 g) was identified by Raman spectroscopy as CsSbF$_6$. The $-95°$ C. fraction was used for the characterization of HOIF$_4$O and was shown by vibrational and F NMR analysis to be free of IF$_5$O.

For the elemental analysis, 278.7 mg of the material was condensed at $-196°$ C. into an ampule containing 12 ml of frozen 1 N NaOH. The mixture was warmed to ambient temperature for twelve hours and then analyzed for total iodine by energy dispersive X-ray fluorescence spectrometry, for IO$_4^-$ by iodometric titration, for base consumption by back titration with 0.1 N HCl using a pH electrode and for fluoride by titration using La(NO$_3$)$_3$ and an anion specific ion electrode. Anal. calcd for FOIF$_4$O: I, 49.98; F, 37.42; OH$^-$ consumed, 6.0 equiv/mol; iodometric titration, 8.0 equiv/mol, assuming the following hydrolysis reaction:

$$FOIF_4O + 6OH^- \rightarrow IO_4^- 5F^- + 0.5\ O_2(g) + 3H_2O$$

Found: I, 50.0; F, 36.0; OH$^-$ consumed, 6.1 equiv/mol; iodometric titration, 7.8 equiv/mol.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A compound having an empirical formula which consists essentially of FOIF$_4$O.

2. A compound having an empirical formula of FOIF$_4$O which comprises a stereo-isomer selected from the group consisting of

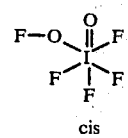

cis and

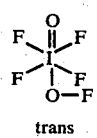

trans and mixtures thereof.

3. The compound of claim 2 wherein one stereo-isomer has the cis structural formula comprising

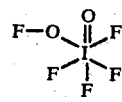

4. The compound of claim 2 wherein a second stereo-isomer has the trans structural formula comprising

5. A process for preparing FOIF$_4$O, comprising the steps of:
metathetically reacting solutions of NF$_4$SbF$_6$ and CsIF$_4$O$_2$ in anhydrous HF;
removing the CsSbF$_6$ precipitate and HF solvent; and
thermally decomposing the filtrate residue.

* * * * *

UNITED STATES PATENT AND TRADEMARK OFFICE
CERTIFICATE OF CORRECTION

PATENT NO. : 4,329,330
DATED : May 11, 1982
INVENTOR(S) : Karl O. Christe et al

It is certified that error appears in the above-identified patent and that said Letters Patent are hereby corrected as shown below:

Column 3, line 43, after "$IO_4^-$" and before "$5F^-$" insert --+--.

Signed and Sealed this

Third Day of August 1982

[SEAL]

Attest:

GERALD J. MOSSINGHOFF

Attesting Officer

Commissioner of Patents and Trademarks